T. F. ALLEN.
Car Truck.
No. 30,450. Patented Oct. 23, 1860.
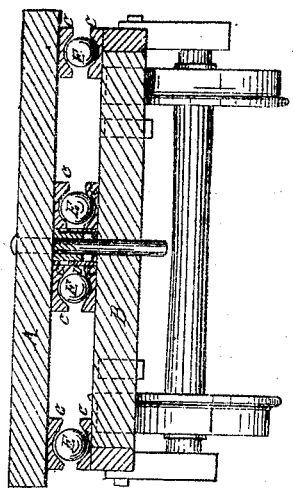
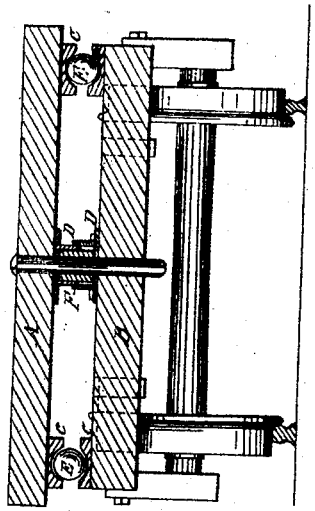
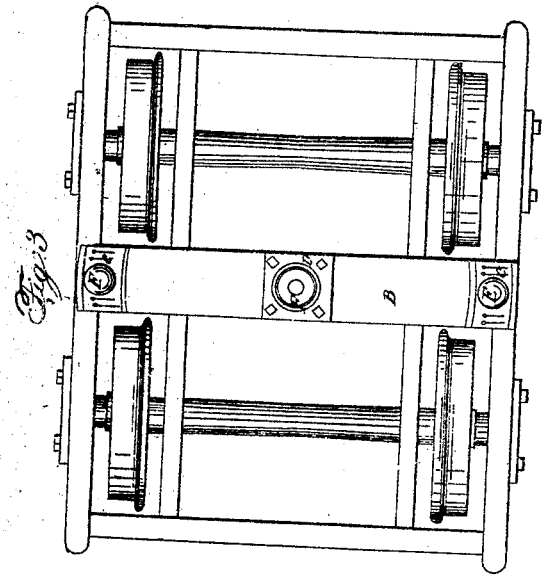
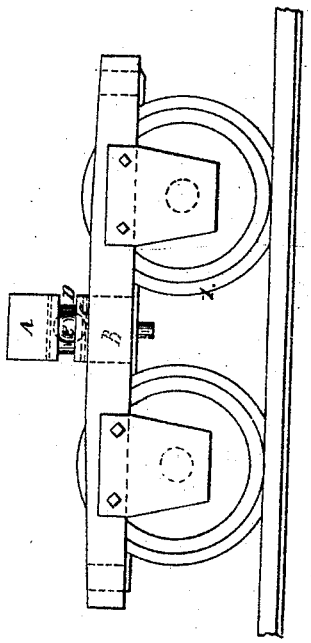
Witnesses:
John O. Work
Milton Bradley
Inventor
T. F. Allen

UNITED STATES PATENT OFFICE.

T. F. ALLEN, OF DYERSVILLE, IOWA.

INDIA-RUBBER RAILWAY-CAR SPRING.

Specification of Letters Patent No. 30,450, dated October 23, 1860.

*To all whom it may concern:*

Be it known that I, T. F. ALLEN, of Dyersville, in the county of Dubuque and State of Iowa, have invented a new and Improved Mode of Forming and Using India-Rubber Railway-Car Springs; and I do hereby declare that the following is a full and exact description thereof, reference being had to the accompanying drawings and to the letters of reference marked thereon.

Figure 1, is a side elevation of a railway car truck, having my improvement applied to it. Fig. 2, is a vertical transverse section of the same, and, Fig. 3, is a plan or top view of the same, with the bolster of the car body detached. Fig. 4, is the same as Fig. 2, excepting the springs and plates for the same, in the central part of the truck.

Similar letters of reference in each of the figures indicate corresponding parts.

The nature of my invention consists in the use of india rubber balls resting on the truck frame and supporting the car body, and held between metallic concave plates, so as to perform the double function of springs and friction rollers.

To enable others skilled in the art to make and use my invention I will proceed to describe its construction and operation.

In the drawings I have shown a freight car truck, constructed in the usual form of wooden trucks, but I do not limit the application of my invention to this kind of truck only, as it may with facility be applied to all kinds of railway car trucks in general use.

A in the drawings represents the bolster of a car body; B, the central transverse beam of the truck frame. On the bolster and beam I fasten the concave plates C, and the hollow transom plates D. In or between the plates C, I place the india rubber balls E, and in or between the transom plates D, I place the cylindrical rubber F, as shown in Fig. 2.

In Fig. 4, I show the india rubber balls E, and the metallic concave plates D, instead of the cylindrical rubber F, as shown in Figs. 2 and 3.

In Fig. 3, I also show the concave side or face of the plates C, with the grooves O, the object of which is to control the balls E, when the truck swivels in running on a curve or otherwise.

The india rubber balls arranged as hereinbefore described act at once as springs and friction rollers—as springs at all times when the car is in motion—as friction rollers whenever the car is running on a curve.

What I claim and desire to secure by Letters Patent, is—

The use in the construction of railway cars of india rubber balls resting on the truck and supporting the car body, and held between concave plates, substantially as hereinbefore described.

T. F. ALLEN.

Witnesses:
JOHN O. WORK,
MILTON BRADLEY.